(12) United States Patent
Chen et al.

(10) Patent No.: US 7,522,319 B2
(45) Date of Patent: Apr. 21, 2009

(54) DUPLEX SCANNER

(75) Inventors: Yen-Cheng Chen, Chupei (TW); Shing-Chia Chen, Ciaotou Township, Kaohsiung County (TW)

(73) Assignee: Avision Inc. (TW)

( * ) Notice: Subject to any disclaimer, the term of this patent is extended or adjusted under 35 U.S.C. 154(b) by 1000 days.

(21) Appl. No.: 11/071,357

(22) Filed: Mar. 4, 2005

(65) Prior Publication Data

US 2005/0213168 A1    Sep. 29, 2005

(30) Foreign Application Priority Data

Mar. 24, 2004    (TW) ............................... 93108027 A

(51) Int. Cl.
*H04N 1/04* (2006.01)
*G03B 27/52* (2006.01)

(52) U.S. Cl. .................. 358/474; 358/496; 358/498; 355/24

(58) Field of Classification Search ................ 358/474, 358/482, 483, 486, 488, 491, 496, 497, 498; 235/462.41, 462.43, 462.44, 475, 476; 355/407, 355/24, 48, 50
See application file for complete search history.

(56) References Cited

U.S. PATENT DOCUMENTS

| | | | |
|---|---|---|---|
| 6,108,106 A * | 8/2000 | Hayashi et al. ............ | 358/473 |
| 7,014,289 B1 * | 3/2006 | Matsuda ...................... | 347/19 |
| 7,019,873 B2 * | 3/2006 | Tohyama et al. ............ | 358/496 |
| 7,336,404 B2 * | 2/2008 | Benham ...................... | 358/488 |
| 2002/0036808 A1 * | 3/2002 | Tohyama et al. ............ | 358/497 |
| 2002/0036809 A1 * | 3/2002 | Tohyama et al. ............ | 358/498 |
| 2004/0027620 A1 * | 2/2004 | Tseng ......................... | 358/474 |
| 2004/0238199 A1 * | 12/2004 | Yamanaka et al. ......... | 174/68.1 |
| 2005/0178834 A1 * | 8/2005 | Natsuno ..................... | 235/449 |
| 2005/0179959 A1 * | 8/2005 | Lien .......................... | 358/406 |

* cited by examiner

*Primary Examiner*—Jerome Grant, II

(57) ABSTRACT

A duplex scanner comprising a first scanning module, a second scanning module, a transmission mechanism, a power source and a control processing unit is provided. The first scanning module scans a front side of a to-be-scanned document and captures a front side image of the to-be-scanned document. The second scanning module scans a back side of the to-be-scanned document and captures a back side image of the to-be-scanned document. The transmission mechanism moves the to-be-scanned document relatively to the first scanning module and the second scanning module. The power source outputs at least a feedback signal while driving the transmission mechanism. The control processing unit receives a scan command and accordingly controls the power source to drive the transmission mechanism. The control processing unit receives the feedback signal and accordingly controls the first scanning module and the second scanning module to proceed duplex scan.

20 Claims, 5 Drawing Sheets

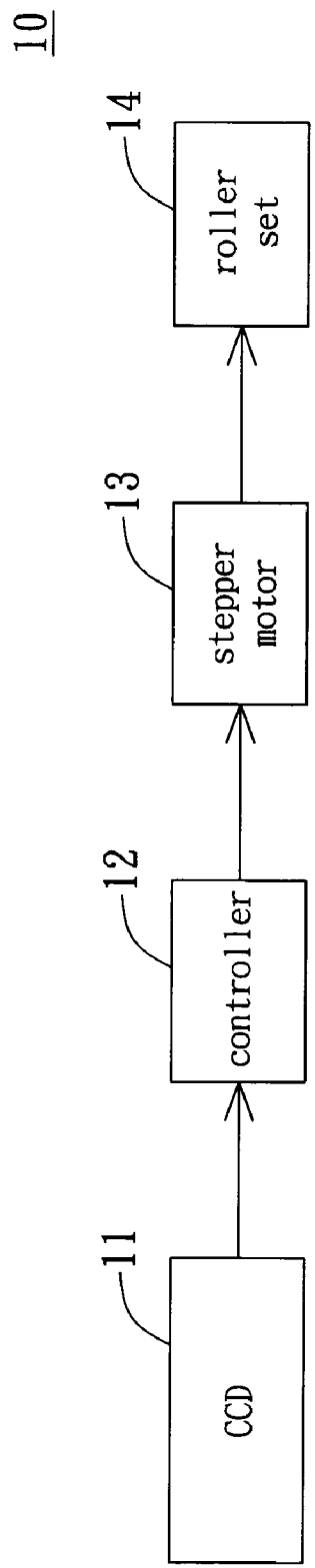
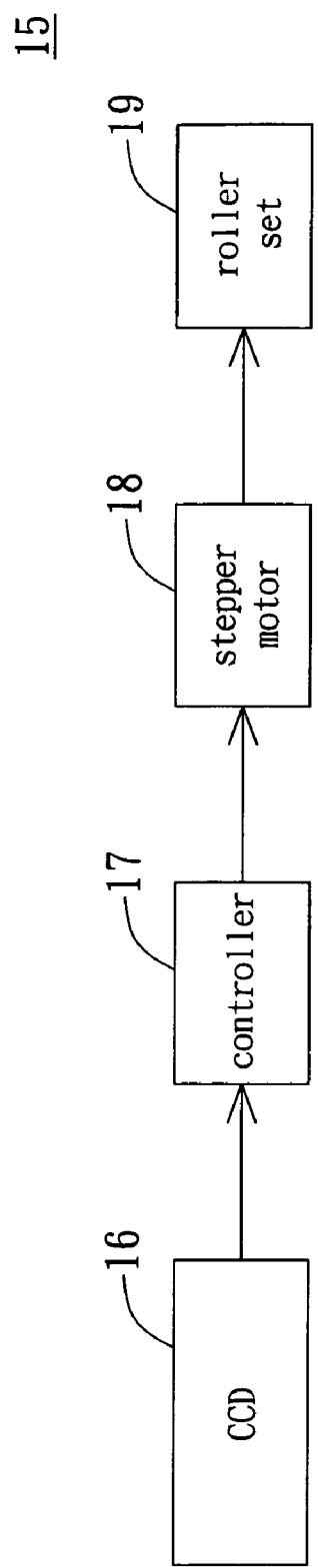
FIG. 1A (PRIOR ART)
FIG. 1B (PRIOR ART)

DUPLEX SCANNER

This application claims the benefit of Taiwan application Serial No. 93108027, filed Mar. 24, 2004, the subject matter of which is incorporated herein by reference.

BACKGROUND OF THE INVENTION

1. Field of the Invention

The invention relates in general to a scanner, and more particularly to a duplex scanner having two scanning modules.

2. Description of the Related Art

Along with the rapid advance in technology, the integration and application of multi-media have become more and more popular. Multi-media refer to data contents of various data types such as texts, images, sounds etc. In order to present data through multi-media, various devices for capturing images or sounds have been developed. For instance, scanner is one of most commonly used tools for capturing images.

Referring to FIG. 1A, a block diagram of a conventional sheet-fed type simplex scanner with a stepper motor is shown. In FIG. 1A, scanner 10 comprises a charge-coupled device (CCD) 11, a controller 12, a stepper motor 13 and a roller set 14. When the scanner 10 starts to scan a to-be-scanned document (not shown in FIG. 1A), firstly, the controller 12 controls the stepper motor 13 to run so as to drive the roller set 14 to move the to-be-scanned document. Next, the controller 12 controls the CCD 11 to capture an image of the to-be-scanned document. When the scanner 10 incorporates a document turning mechanism, the scanner 10 can scan both a front side and a back side of the to-be-scanned document to achieve duplex scan.

Referring to FIG. 1B, a block diagram of a conventional flat-bed type simplex scanner with a stepper motor is shown. The scanner 15 comprises a CCD 16, a controller 17, a stepper motor 18 and a roller set 19. When the scanner 15 starts to scan a to-be-scanned document (not shown in FIG. 1B), the controller 17 controls the stepper motor 18 to run so as to drive the roller set 19 to move the CCD 16, so that CCD 16 can capture the image of the to-be-scanned document. When the scanner 15 incorporates a document turning mechanism, the scanner 15 can scan both a front side and a back side of the to-be-scanned document to achieve duplex scan. However, the document turning mechanism of either type of the simplex scanners would only increase scanning time.

The stepper motor adopts an open-loop control method, and will easily lose step-synchronism when exceeding allowed pull-in torque due to a high rotation rate. If the stepper motor loses the step-synchronism for too long, a motor stall will occur and becomes an unsolvable problem. Besides, if the stepper motor adopts micro-stepping driving method, the positional accuracy is normally hard to achieve the required smooth level. Besides, due to limitation imposed by the internal structure of the stepper motor, a stepper motor normally is not functional at a rotational speed over 5000 rpm, and has poor torque characteristics at any high rotational speed.

To maintain a maximum holding torque, an open-loop controlled stepper motor is normally operated under fully powered state, resulting in a high operating temperature. The stepper motor has significant noises and mechanic vibration problems when operating in full step state, especially at a low rotational speed. Moreover, the resonant band of the stepper motor is too many and too wide, such that when other mechanisms are incorporated, resonance and noises are easily induced. The open-loop controlled stepper motor will be inadequate to accommodate scanner's future requirements, such as high rotational speed, high load, high load variation, little vibration, low noises and high scanning speed.

SUMMARY OF THE INVENTION

It is therefore an object of the invention to provide a duplex scanner. With the design of a power source to output feedback signal, the duplex scanner according to the invention, which can resolve problems frequently encountered such as loss of step-synchronism, motor stall, high operating temperature, vibration, noises and low scanning speed when a conventional open-loop control stepper motor is adopted, meets the requirements of high rotation rate, high load, high load variation, little vibration, low noises and high scanning speed.

It is therefore another object of the invention to provide a duplex scanner, comprising a first scanning module, a second scanning module, a transmission mechanism, a power source and a control processing unit. The first scanning module is for scanning a front side of a to-be-scanned document and capturing a front side image of the to-be-scanned document. The second scanning module is for scanning a back side of the to-be-scanned document and capturing a back side image of the to-be-scanned document. The transmission mechanism is for enabling the to-be-scanned document to move relatively to the first scanning module and the second scanning module, while the power source is for driving the transmission mechanism and outputting at least a feedback signal. The control processing unit receives a scan command and accordingly controls the power source to drive transmission mechanism. The control processing unit receives the feedback signal and accordingly controls the first scanning module and the second scanning module to proceed duplex scan.

It is therefore another object of the invention to provide a duplex scanner, comprising a first scanning module, a second scanning module, a first transmission mechanism, a second transmission mechanism, a first power source, a second power source and a control processing unit. The first scanning module is for scanning a front side of a to-be-scanned document and capturing a front side image of the to-be-scanned document. The second scanning module is for scanning a back side of a to-be-scanned document and capturing a back side image of the to-be-scanned document. The first transmission mechanism is for moving the first scanning module. The second transmission mechanism is for moving the to-be-scanned document. The first power source is for driving the first transmission mechanism, such that the first transmission mechanism moves the first scanning module to a position corresponding to a position of the second scanning module. The second power source is for driving the second transmission mechanism and outputting at least a feedback signal accordingly. The control processing unit receives a scan command and accordingly controls the second power source to drive the second transmission mechanism, while the control processing unit receives the feedback signal and accordingly controls the first scanning module and the second scanning module to proceed duplex scan.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 1A is a block diagram of a conventional sheet-fed type simplex scanner with a stepper motor;

FIG. 1B is a block diagram of a conventional flat-bed type simplex scanner with a stepper motor;

DETAILED DESCRIPTION OF THE INVENTION

Preferred Embodiment One

Figure 2A:
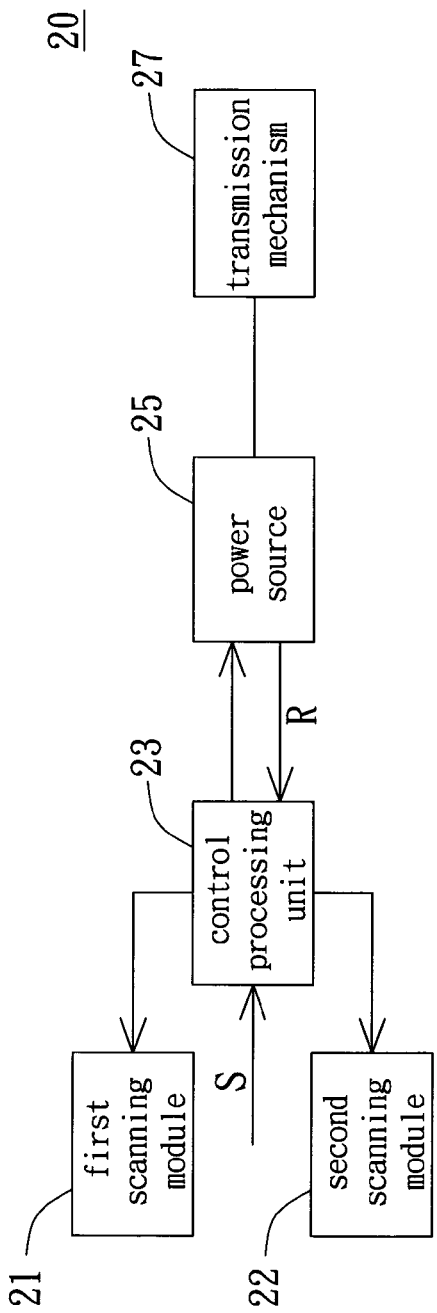
FIG. 2A is a block diagram of duplex scanner according to preferred embodiment one of the invention.
Figure 2B:
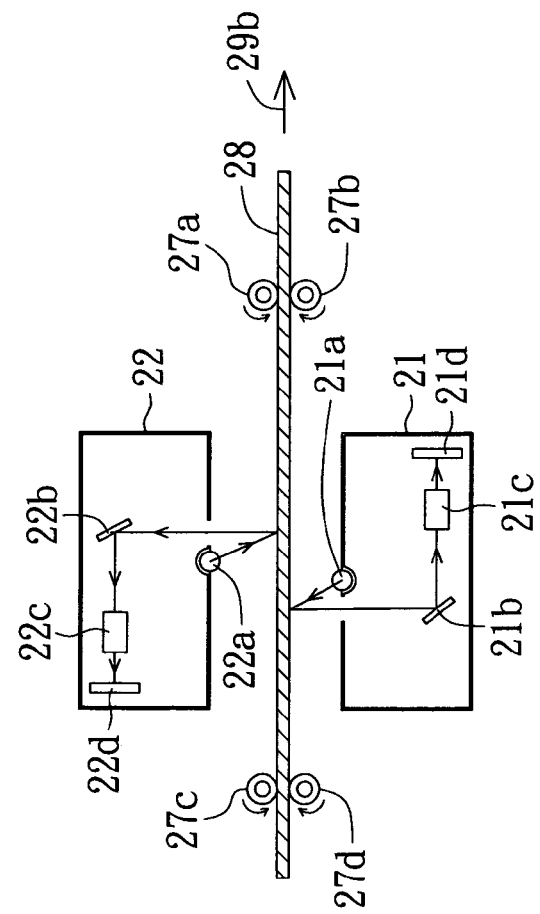
FIG. 2B is a structural diagram illustrating the state when the transmission mechanism in FIG. 2A moves the to-be-scanned document.

Referring to FIG. 2A, a block diagram of duplex scanner according to preferred embodiment one of the invention is shown. In FIG. 2A, a duplex scanner 20 at least comprises a first scanning module 21, a second scanning module 22, a control processing unit 23, a power source 25 and a transmission mechanism 27. As shown in FIG. 2B, the first scanning module 21 is for scanning a front side of a to-be-scanned document 28 and capturing the front side image of the to-be-scanned document 28. The second scanning module 22 is for scanning a back side of the to-be-scanned document 28 and capturing the back side image of the to-be-scanned document 28. The transmission mechanism 27 is for enabling the to-be-scanned document 28 to move relatively to the first scanning module 21 and the second scanning module 22.

Figure 2C:
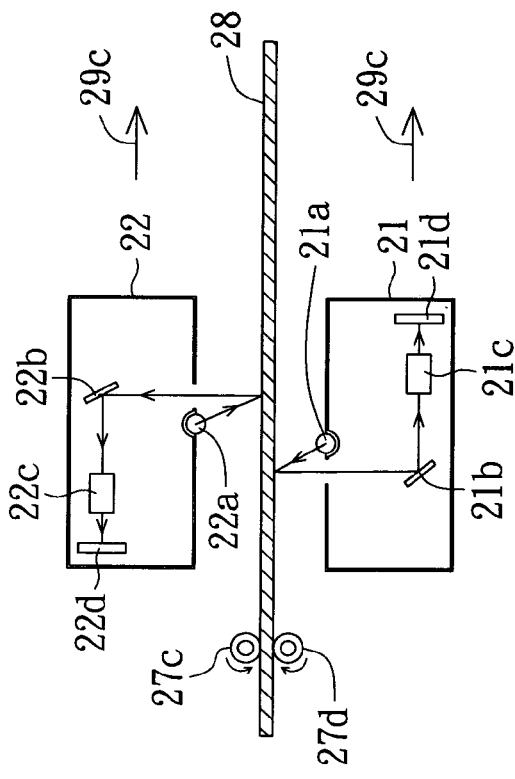
FIG. 2C is a structural diagram illustrating the state when the transmission mechanism in FIG. 2A moves the first scanning module and the second scanning module.

Assuming that the first scanning module 21 and the second scanning module 22 in FIG. 2B remain still, then the transmission mechanism 27 in FIG. 2A is a roller set comprising rollers 27a, 27b, 27c and 27d. The roller set comprising rollers 27a~27d is for transporting the to-be-scanned document 28, so that the to-be-scanned document 28 moves along the direction of an arrow 29b in FIG. 2B to achieve duplex scan. As shown in FIG. 2C, assuming that the to-be-scanned document 28 remains still, the transmission mechanism 27 in FIG. 2A is for moving the first scanning module 21 and the second scanning module 21, so that the first scanning module 21 and the second scanning module 21 move along the direction of an arrow 29c in FIG. 2C to achieve duplex scanning as well. In FIGS. 2B~2C, the first scanning module 21 comprising a first light source 21a, a first reflector 21b, a first lens 21c and a first charge coupled device (CCD) 21d, while the second scanning module 22 comprises a second light source 22a, a second reflector 22c, a second lens 22d and a second CCD 22d.

The power source 25 is for driving the transmission mechanism 27, and has an encoder wheel, a light emitting diode (LED) and a photo sensor when the power source 25 is a servo motor of direct current (DC) motor type or alternating current (AC) motor type. The encoder wheel comprising a number of spokes radiating from the central spin axis towards the wheel, the clearance between two adjacent spokes allows a light beam to pass through, and the LED and the photo sensor are disposed on the two sides of the encoder wheel. When the light emitted by the LED passes through the clearance between two adjacent spokes, the photo sensor will receive the light beam passing through the encoder wheel and accordingly sends out a pulse signal of other type, a feedback signal R for instance. When the power source 25 drives the transmission mechanism 27, the encoder wheel will rotate synchronically with the servo motor of the power source 25. Since the spokes of the encoder wheel rotate like a fan, the photo sensor will continually to receive the light beam passing through the encoder wheel and continually send out a feedback signal R. If the transmission mechanism 27 is driven faster by the power source 25, the encoder wheel will rotate faster as well. Meanwhile, the photo sensor will receive light beams at a higher frequency within a pre-determined time (one second for instance), which means that the photo sensor has a larger signal outputting frequency. The control processing unit 23 receives a scan command S and accordingly controls the power source 25 to drive the transmission mechanism 27. The control processing unit 23 receives the feedback signal R and accordingly controls the first scanning module 21 and the second scanning module 22 to proceed duplex scan.

However, anyone who is familiar with the technology will understand that the technology of the invention is not limited thereto. For example, the control processing unit 23 can be an application specific integrated circuit (ASIC) or a microprocessor, the power source 25 can be a feedback controllable stepper motor. The duplex scanner 20 further comprises an input interface for generating a scan command S when being touched; duplex scanning input interface could be devices such as buttons or a touch panel. The scan command S can be outputted by an electronic device which is coupled with the duplex scanner 20, wherein the duplex scanner 20 can be connected with the electronic device through wire or wirelessly, the electronic device can be a desk-top, a lap-top, a palm-top or a notebook computer, etc.

The control processing unit 23 further comprises a timing generator, which, according to feedback signal R, generates a timing control signal for controlling the first scanning module 21 to proceed duplex scanning with the second scanning module 22. Besides, the control processing unit 23 further comprises a first control processing unit and a second control processing unit, wherein the first control processing unit and the second control processing unit receive the feedback signal R whereby the first scanning module 21 is controlled to proceed duplex scanning with the second scanning module 23 accordingly.

Preferred Embodiment Two

Figure 3A:
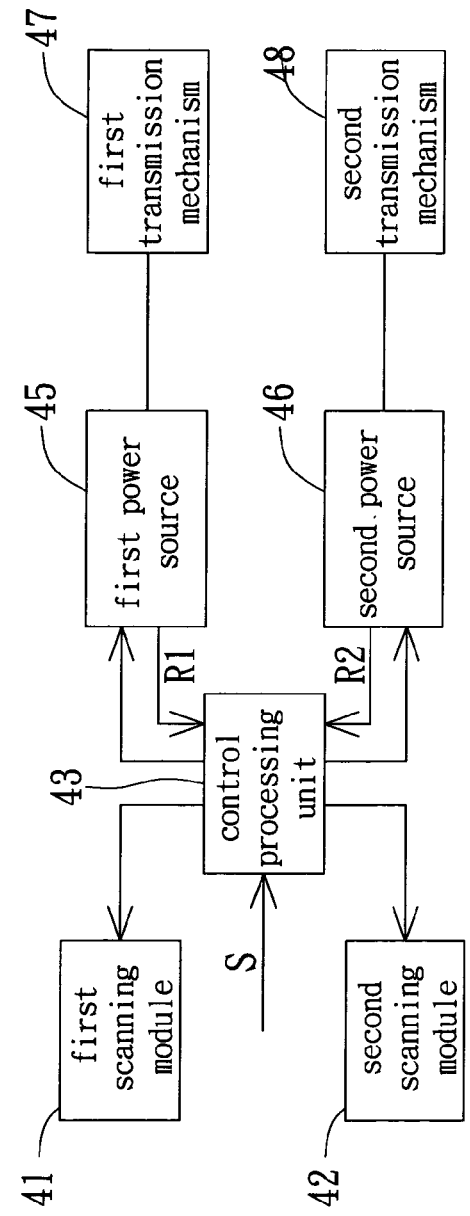
FIG. 3A is a block diagram of duplex scanner according to preferred embodiment two of the invention.
Figure 3B:
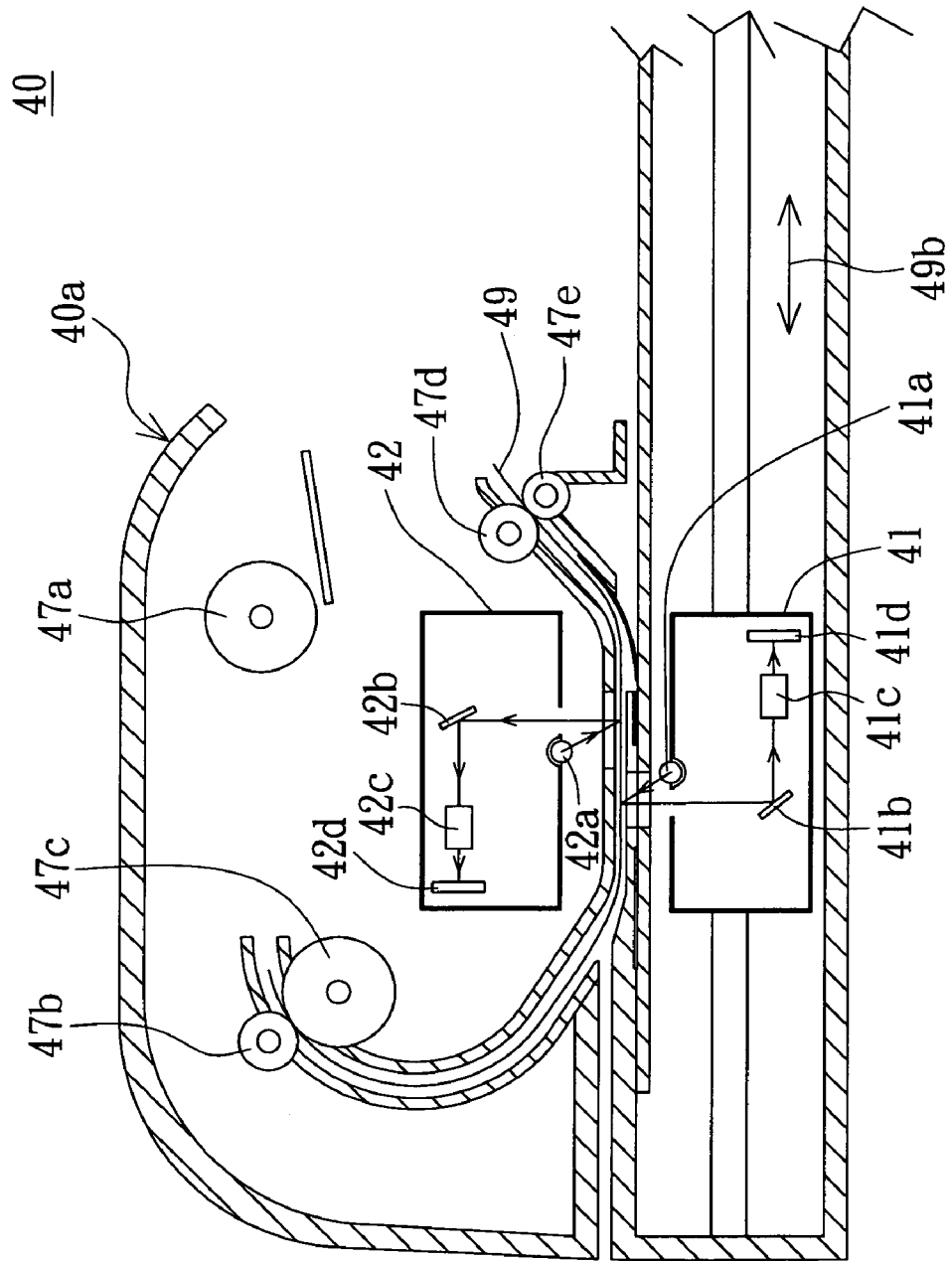
FIG. 3B is a structural diagram illustrating the state when the duplex scanner is a flat-bed type duplex scanner incorporating an ADF.

Referring to FIG. 3A, a block diagram of duplex scanner according to preferred embodiment two of the invention is shown. In FIG. 3A, a duplex scanner 40 at least comprises a first scanning module 41, a second scanning module 44, control processing unit 43, a first power source 45, a second power source 46, a first transmission mechanism 47 and a second transmission mechanism 48. As shown in FIG. 3B, the first scanning module 41 is for scanning a front side of a to-be-scanned document 49 and capturing the front side image of the to-be-scanned document 49. The second scanning module 44 is for scanning a back side of the to-be-scanned document 49 and capturing a back side image of the to-be-scanned document 49. The first transmission mechanism 47 is for moving the first scanning module 41, while the second transmission mechanism 48 is for moving the to-be-scanned document 49.

The duplex scanner 40 in FIG. 3B can be a flat-bed type duplex scanner incorporating an automatic document feeder (ADF) 40a. The first scanning module 41 comprises a first light source 41a, a first reflector 41b, a first lens 41c and a first CCD 41d. The second scanning module 42 comprises a second light source 42a, a second reflector 42b, a second lens 42c and a second CCD 42d. When the second scanning module 42 remains still, the first scanning module 41 can move along the direction of an arrow 49b in FIG. 3B. The second transmission mechanism 48 can be a roller set comprising rollers 47a, 47b, 47d, 47e and 47f. The rollers 47a~47f convey the document, so that the to-be-scanned document 49 is fed by the ADF 40a and is moved to a duplex scanning area located between the first scanning module 41 and the second scanning module 42.

The first power source 45 is for driving the first transmission mechanism 47 and accordingly outputting a first feedback signal R1. The second power source 46 is for driving the second transmission mechanism 48 and accordingly outputting a second feedback signal R2. When the control processing unit 43 receives a scan command S, the control processing unit 43 will receive a first feedback signal R1 if the first scanning module 41 has not arrived at the pre-determined position. The control processing unit 43 receives the first feedback signal R1 and then accordingly controls the first power source 45 to drive the first transmission mechanism 47, such that the first scanning module 41 is moved to a position corresponding to a position of the second scanning module as shown in FIG. 3B. When the first scanning module 41 arrives at the pre-determined position, the control processing unit 43 accordingly controls the second power source 46 to drive the second transmission mechanism 48, such that the to-be-scanned document 49 passes through the duplex scanning area located between the first scanning module 41 and the second scanning module 42. The control processing unit 43 receives the second feedback signal R2 and accordingly controls the first scanning module 41 and the second scanning module 42 to proceed duplex scan.

However, anyone who is familiar with the technology will understand that the technology of the invention is not limited thereto. For example, the control processing unit 43 can be an ASIC or a microprocessor, while the first power source 45 can be a feedback controllable servo motor or a feedback controllable stepper motor, and the second power source 46 can be a feedback controllable servo motor or a feedback controllable stepper motor. Besides, the duplex scanner 40 further comprises an input interface for generating a scan command S when being touched. The scan command S can be outputted by an electronic device coupled with a duplex scanner 30, wherein the duplex scanner 30 can be coupled with the electronic device through wire or wirelessly, while the electronic device can be a desk-top, a lap-top, a palm-top or a notebook computer, etc. The control processing unit 43 further comprises a timing generator, which, according to the second feedback signal R2, generates a timing control signal for controlling the first scanning module 41 to proceed duplex scanning with the second scanning module 42.

Preferred Embodiment Three

Figure 4:
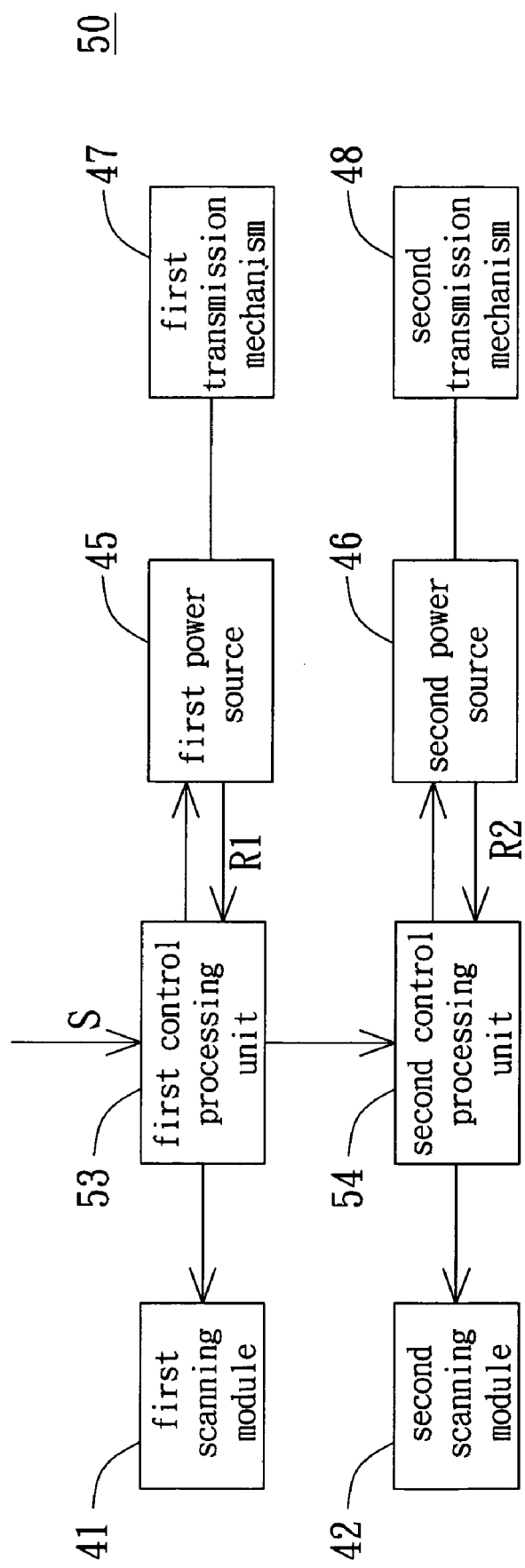
FIG. 4 is a block diagram of duplex scanner according to preferred embodiment three of the invention.

Referring to FIG. 4, a block diagram of duplex scanner according to preferred embodiment three of the invention is shown. The duplex scanner 50 in present preferred embodiment differs with the duplex scanner 40 in preferred embodiment in the first control processing unit 53 and the second control processing unit 54, as for other similar constituting elements, the same labeling are used and are not repeated here. In FIG. 4, either both the first control processing unit 53 and the second control processing unit 54 can receive the scan command S, or one of the first control processing unit 53 and the second control processing unit 54 will receive the scan command S. The first control processing unit 53 will receive the scan command S and determine whether the first scanning module 41 has arrived at the pre-determined position or not. If the first scanning module 41 has not arrived at the pre-determined position, the first control processing unit 53 will receive a first feedback signal R1 and accordingly control the first power source 45 to drive the first transmission mechanism 47, such that the first scanning module 41 will be moved to a position corresponding to a position of the second scanning module as shown in FIG. 3B. If the first scanning module 41 has arrived at the pre-determined position, the second control processing unit 54 will accordingly control the second power source 46 to drive the second transmission mechanism 48. The second control processing unit 54 receives the second feedback signal R2 and accordingly controls the first scanning module 41 and the second scanning module 42 to proceed duplex scan. The second control processing unit 54, via the first control processing unit 53, controls the first scanning module 41 to complete duplex scan.

However, anyone who is familiar with the technology will understand that the technology of the invention is not limited thereto. For example, the first control processing unit 53 and the second control processing unit 54 can be two ASICs or two microprocessors. Besides, the duplex scanner 50 further comprises an input interface for generating a scan command S when being touched. The scan command S can be outputted by an electronic device coupled with a duplex scanner 40, wherein the duplex scanner 40 can be coupled with the electronic device through wire or wirelessly, the electronic device can be a desk-top, a lap-top, a palm-top or a notebook computer, etc.

With the design of a power source to output feedback signal, the duplex scanner disclosed in above preferred embodiments according to the invention, which can resolve problems frequently encountered such as loss of step-synchronism, motor stall, high operating temperature, vibration, noises and low scanning speed when a conventional open-loop control stepper motor is adopted, meets the requirements of high rotation rate, high load, high load variation, little vibration, low noises and high scanning speed While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A duplex scanner comprising:
   a first scanning module for scanning a front side of a to-be-scanned document and capturing a front side image of the to-be-scanned document;
   a second scanning module for scanning a back side of the to-be-scanned document and capturing a back side image of the to-be-scanned document;
   a transmission mechanism for enabling the to-be-scanned document to move relatively to the first scanning module and the second scanning module;
   a power source for driving the transmission mechanism and outputting at least a feedback signal; and
   a control processing unit for receiving a scan command and accordingly controlling the power source to drive the transmission mechanism, wherein the control processing unit receives the feedback signal and accordingly controls the first scanning module and the second scanning module to proceed duplex scan.

2. The duplex scanner according to claim 1, wherein the power source is a servo motor.

3. The duplex scanner according to claim 1, wherein the power source is a stepper motor.

4. The duplex scanner according to claim 1, wherein the control processing unit is an application specific integrated circuit (ASIC).

5. The duplex scanner according to claim 1, wherein the control processing unit further comprises a timing generator, which, according to the feedback signal, generates a timing control signal for controlling the first scanning module and the second scanning module to proceed duplex scan.

6. The duplex scanner according to claim 1, wherein the transmission mechanism is a roller set for transporting the to-be-scanned document.

7. The duplex scanner according to claim 1, wherein the transmission mechanism moves the first scanning module and the second scanning module.

8. The duplex scanner according to claim 1, wherein the first scanning module comprises a first charge coupled device (CCD) and the second scanning module comprises a second CCD.

9. A duplex scanner comprising: a first scanning module for scanning a front side of a to-be-scanned document and capturing a front side image of the to-be-scanned document; a second scanning module for scanning a back side of the to-be-scanned document and capturing the back side image of the to-be-scanned document; a first transmission mechanism for moving the first scanning module; a second transmission mechanism for moving the to-be-scanned document; a first power source for driving the first transmission mechanism, such that the first transmission mechanism moves the first scanning module to a position corresponding to a position of the second scanning module; a second power source for driving the second transmission mechanism and accordingly outputting at least a second power source feedback signal; and a control processing unit, which receives a scan command and accordingly controls the second power source to drive the second transmission mechanism, wherein the control processing unit receives the second power source feedback signal and accordingly controls the first scanning module and the second scanning module to proceed duplex scan.

10. The duplex scanner according to claim 9, wherein the control processing unit further comprises a timing generator, which, according to the second power source feedback signal, generates a timing control signal for controlling the first scanning module and the second scanning module to proceed duplex scan.

11. The duplex scanner according to claim 9, wherein the second power source is a feedback controllable servo motor.

12. The duplex scanner according to claim 9, wherein the second power source is a feedback controllable stepper motor.

13. The duplex scanner according to claim 9, wherein the first power source drives the first transmission mechanism and at the same time outputs at least a first power source feedback signal; the control processing unit receives the first power source feedback signal and accordingly controls the first power source to drive the first transmission mechanism, such that the first transmission mechanism moves the first scanning module to the position corresponding to the position of the second scanning module.

14. The duplex scanner according to claim 13, wherein the first power source is a feedback controllable servo motor.

15. The duplex scanner according to claim 13, wherein the first power source is a feedback controllable stepper motor.

16. The duplex scanner according to claim 9, wherein the control processing unit is an application specific integrated circuit (ASIC).

17. The duplex scanner according to claim 9, wherein the control processing unit comprises: a first control processing unit, which receives the scan command and controls the first power source to drive the first transmission mechanism, such that the first transmission mechanism moves the first scanning module to the position corresponding to the position of the second scanning module; and a second control processing unit which receives the scan command and accordingly controls the second power source to drive the second transmission mechanism, wherein the second control processing unit receives the second power source feedback signal and accordingly controls the first scanning module and the second scanning module to proceed duplex scan; wherein the second control processing unit, via the first control processing unit controls the first scanning module to complete duplex scan.

18. The duplex scanner according to claim 17, wherein the first power source drives the first transmission mechanism and at the same time outputs at least a first feedback signal;
the first control processing unit receives the first feedback signal and accordingly controls the first power source to drive the first transmission mechanism, such that the first transmission mechanism moves the first scanning module to the position corresponding to the position of the second scanning module.

19. The duplex scanner according to claim 17, wherein the first control processing unit and the second control processing unit are two application specific integrated circuits (ASIC).

20. The duplex scanner according to claim 9, wherein the duplex scanner is a flat-bed type duplex scanner incorporating an automatic document feeder (ADF).

* * * * *